(12) United States Patent (10) Patent No.: US 8,390,515 B2
Ketonen (45) Date of Patent: Mar. 5, 2013

(54) METHOD FOR SIGNAL SOURCE MONITORING AND POSITIONING IN A RADIO NETWORK

(75) Inventor: Veli-Pekka Ketonen, Itasalmi (FI)

(73) Assignee: 7signal Oy, Helsinki (FI)

( * ) Notice: Subject to any disclaimer, the term of this patent is extended or adjusted under 35 U.S.C. 154(b) by 387 days.

(21) Appl. No.: 12/668,144

(22) PCT Filed: Jul. 9, 2008

(86) PCT No.: PCT/FI2008/050422
§ 371 (c)(1),
(2), (4) Date: Jul. 14, 2010

(87) PCT Pub. No.: WO2009/007513
PCT Pub. Date: Jan. 15, 2009

(65) Prior Publication Data
US 2010/0283678 A1 Nov. 11, 2010

(30) Foreign Application Priority Data

Jul. 11, 2007 (FI) ...................................... 20075534

(51) Int. Cl.
*G01S 3/02* (2006.01)
(52) U.S. Cl. ........................................................ 342/450
(58) Field of Classification Search .................... 342/450
See application file for complete search history.

(56) References Cited

U.S. PATENT DOCUMENTS

| 5,873,048 A | 2/1999 | Yun |
| 5,945,948 A | 8/1999 | Buford et al. |
| 7,072,669 B1 | 7/2006 | Duckworth |
| 2003/0072294 A1* | 4/2003 | Wei et al. ...................... 370/345 |
| 2003/0117320 A1 | 6/2003 | Kim et al. |
| 2003/0148774 A1 | 8/2003 | Naghian et al. |
| 2005/0030929 A1 | 2/2005 | Swier, Jr. et al. |
| 2005/0032531 A1 | 2/2005 | Gong et al. |
| 2005/0186938 A1 | 8/2005 | Hunter |
| 2005/0245286 A1 | 11/2005 | Lin et al. |
| 2008/0174431 A1* | 7/2008 | Rodgers ..................... 340/572.1 |

FOREIGN PATENT DOCUMENTS

| WO | 9312590 A1 | 6/1993 |
| WO | 97/28456 | 8/1997 |

OTHER PUBLICATIONS

International Search Report dated Nov. 5, 2008, from corresponding PCT application.
Finnish Search Report dated Jan. 8, 2008, from corresponding Finnish application.
European Search Report dated Jul. 13, 2012, from corresponding EP application.

* cited by examiner

*Primary Examiner* — Harry Liu
(74) *Attorney, Agent, or Firm* — Young & Thompson

(57) ABSTRACT

The present invention discloses a method for positioning signal sources in a wireless network, e.g. in a WLAN or WiMAX network. The located signal source might be a end user, an interfering source or a base station. At least one monitoring station is placed in the network, which use directional antennas. By combining e.g. the direction of the used antenna beam, the received relative signal levels, propagation delay measurements and several different measurement locations for one or several monitoring stations, the location of the signal source can be determined accurately. The method can also track whether the end user is connected to the most optimal base station by transmitting test signals through base stations.

30 Claims, 9 Drawing Sheets

METHOD FOR SIGNAL SOURCE MONITORING AND POSITIONING IN A RADIO NETWORK

BACKGROUND OF THE INVENTION

1. Field of the Invention

The present invention relates to monitoring and positioning of interference sources, base stations and users in wireless networks.

2. Description of the Related Art

In wireless networks there exists interference which can originate from different sources. Interference sources can be base stations used by other networks, video devices, malfunctioning microwave ovens, baby alarm devices and any other devices which use the same frequency band with the used radio links. There is a need to monitor and detect the interference sources quickly in order to ensure good quality for the data traffic in the network.

In prior art, interference sources have been detected by mostly manual measurement configurations. One solution in prior art uses a measurement computer (PC), appropriate spectrum analyzing software, WLAN card and a separate beam antenna. In this configuration, the beam antenna has been connected to the antenna port of the measurement computer. The antenna is manually held e.g. in the hand of the user and by rotating the antenna, the interference magnitude in different directions is found out. The PC and the spectrum analyzing software can be replaced by a complete spectrum analyzer. One problem in such a solution is that the measurement must be performed manually which increases the error of the measurement. Furthermore, the interference, which is present only occasionally, is practically untraceable by such a device. Also the measurement requires much time and requires a lot of effort. In practice this procedure is performed after the network user has reported bad connection quality to the administrator. It is also difficult to find WLAN cards which could be used with an external antenna and with a spectrum analyzing software in a laptop computer.

Furthermore in prior art, wireless intrusion detection prevention system (WIDPS) has been developed. The WIDPS includes measurement stations which have a capability to measure the RF signal level and the overall noise level. The WIDPS system includes security monitoring stations using omnidirectional antennas which can detect the signal or interference level in different measurement stations. The positioning of the signal or interference sources is based on the measured signal level at each of multiple stations and the location of the interference source is estimated therefrom. The WIDPS requires a vast amount of monitoring stations in the network area in order to work properly. A problem in the WIDPS solution is that the system doesn't work with ad hoc measurements in a network which does not include the WIDPS system itself. The WIDPS further includes a rather advanced installing procedure in order to teach the apparatus to locate the interference sources properly. Furthermore, WIDPS monitoring stations with omnidirectional antennas cover clearly smaller area than stations with directive antennas providing signal level amplification often in the range of 7-15 dB. It is worth noticing that 6 dB antenna gain doubles cell radius in open space. Finally, the elevation of the interference source can't be located unless measurement stations are placed both in an upper and lower location as viewed from the interference source.

One known solution is the base station network which uses omnidirectional antennas and which is directed by WLAN switches. In principle, the positioning of the interference sources and other signals is performed as in the WIDPS described above. In addition to limitations already mentioned, a problem in such a solution is that it works only with WLAN switches provided by one manufacturer and with the corresponding base station supported by the switches.

SUMMARY OF THE INVENTION

The invention relates to a method, comprising: measuring received signals in at least one location with a steerable beam antenna by using at least one monitoring station; collecting at least direction of the antenna beam and location of the monitoring station; and calculating the location of the signal source by using said collected parameters from at least two measurements.

The invention relates also to a system for signal source positioning in a wireless communication system, the system comprising: at least one monitoring station comprising measuring means which are configured to measure received signals in at least one location with a steerable beam antenna; a microprocessor configured to collect at least direction of the antenna beam and location of the monitoring station in a memory; and said microprocessor controlling calculating means which are configured to calculate the location of the signal source by using said collected parameters from at least two measurements.

The invention relates also to an electronic device, comprising: a processor configured to measure received signals in at least one location with a steerable beam antenna by using at least one monitoring station, to collect at least direction of the antenna beam and location of the monitoring station and to calculate the location of the signal source by using said collected parameters from at least two measurements.

The invention relates also to a computer program for signal source positioning in a wireless communication system embodied on a computer readable medium, the computer program controlling a data-processing device to perform: measuring received signals in at least one location with a steerable beam antenna by using at least one monitoring station; collecting at least direction of the antenna beam and location of the monitoring station; and calculating the location of the signal source by using said collected parameters from at least two measurements.

The invention relates also to a computer program comprising code for controlling a processor to execute a method comprising: measuring received signals in at least one location with a steerable beam antenna by using at least one monitoring station; collecting at least direction of the antenna beam and location of the monitoring station; and calculating the location of the signal source by using said collected parameters from at least two measurements.

In one embodiment of the invention, the system further comprises antenna steering means configured to steer the antenna beam horizontally, vertically or in both directions before transmission or reception of signals.

In one embodiment of the invention, the system further comprises an electrical compass configured to measure the direction of the antenna beam.

In one embodiment of the invention, the system further comprises connectivity means to the Global Positioning System for measuring the location of the monitoring station.

In one embodiment of the invention, the system further comprises said at least one monitoring station configured to locate the user terminals or base stations of the wireless communication system.

In one embodiment of the invention, the system further comprises said measuring means configured to measure signals in at least two different locations of the monitoring station; and said calculating means configured to define the location of the signal source in the intersecting volume of the at least two used antenna beams.

In one embodiment of the invention, the system further comprises said measuring means configured to measure signal levels with at least two antenna beams of the monitoring station; and if the signal source is detected with both antenna beams, said calculating means are configured to calculate the location of the signal source using the beam amplification forms of the antenna and the measured signal levels.

In one embodiment of the invention, the system further comprises said measuring means configured to measure a round trip time or data transmission/acknowledgement sequence delay in the monitoring station for the signals transmitted and received by the same or by an adjacent monitoring station; said calculating means configured to calculate the distance between the signal source and the monitoring station from the round trip time or data transmission/acknowledgement sequence delay; said calculating means configured to calculate the direction of the signal source using the at least one antenna beam; and said calculating means configured to calculate the location of the signal source from the said angle and the said distance.

In one embodiment of the invention, the system further comprises a transmitter in a monitoring station configured to transmit the measurement results to a server; and second calculating means configured to calculate the location of the signal source in the server.

In one embodiment of the invention, the system further comprises said calculating means configured to determine the signal propagation time for the received signal in the monitoring station; and said calculating means configured to calculate the distance of the signal source from the said propagation time.

In one embodiment of the invention, the system further comprises said calculating means configured to detect the interfering signal source by comparing the received signal level to the noise level, with respect to the received traffic in the network.

In one embodiment of the invention, the system is further implemented in a WLAN or in a WiMAX network, or as part of the Real Time Location System or the Radio Frequency Identification system. In one embodiment of the invention, the system is further comprises a WLAN, a WiMAX network or a radio frequency identification system.

The present invention has an advantage that the interference sources or other transmitters can be monitored and detected automatically with the mobile or fixed monitoring devices. There is a possibility to alarm the network administrator when the interference level exceeds a certain predefined threshold. This results to the fact that the interference sources can be removed from the network even before the network users inform the administrator about the poor network quality or potential problem in the network.

Another advantage is that the system provides location of signal sources in the network in addition providing interference and other measurements.

A further advantage is that the invention speeds up installation and usage of a monitoring unit. Because the unit knows the direction of the antenna beam at each moment and the exact location of the unit itself, installation procedure and monitoring station usage for operative tasks are easy and automated and less errors are likely.

Also the system according to the invention can be installed to any WLAN network utilizing equipment from any supplier.

DETAILED DESCRIPTION OF THE EMBODIMENTS

Reference will now be made in detail to the embodiments of the present invention, examples of which are illustrated in the accompanying drawings.

The present invention presents a method and system for monitoring, tracking and locating signal sources in a precise manner in a mobile telecommunication network. Signal sources can be interference sources but the method can be implemented for positioning the useful signals of the communication network as well. Thus, the method is also suitable for tracking the base stations or the end users of the communication network. The method can be provided for use in several kinds of networks, such as for example in WLAN and WiMAX networks (networks supporting the IEEE 802.16 standard). Nonetheless, the presented method can also be used in other wireless telecommunication networks.

The invention is based on the monitoring stations placed freely in the network area. The monitoring stations are mobile and independently functioning measurement units. The monitoring station is capable of measuring the signal level and the noise level. The monitoring station is also capable of directing its directional antenna or antenna sectors in a manner that both the horizontal and vertical rotation is possible.

Figure 1:
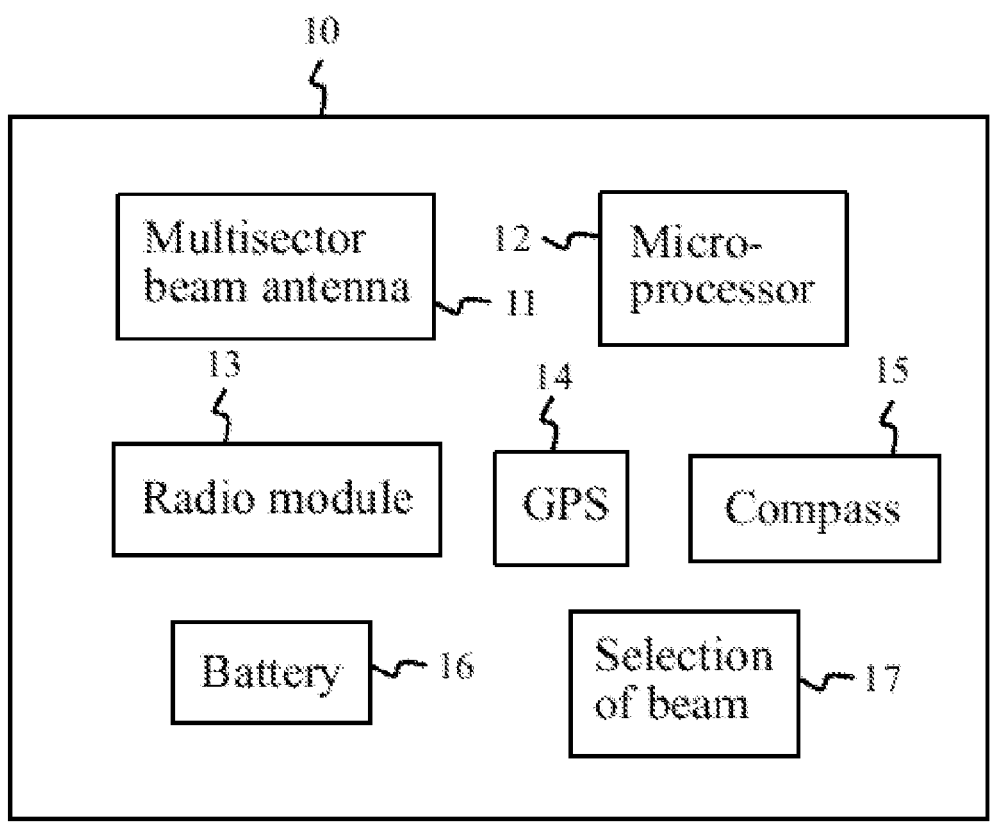
FIG. 1 illustrates an embodiment of the monitoring station and its functionalities according to the invention.

FIG. 1 shows an embodiment of the features implemented in the monitoring station 10. The monitoring station comprises at least one antenna element 11 where each antenna element is capable for creating a directional antenna beam which in an advantageous solution is relatively narrow in its horizontal and vertical width. There could also be only one antenna or antenna group which is capable of changing the direction of the antenna beam. The antenna beam can be rotated both in horizontal and vertical direction. This gives a possibility to cover the whole three-dimensional space in the surrounding environment of the monitoring station. The selection of the beam among the group of antenna beams or more generally, controlling the direction of the antenna beam currently in use 17, is performed by the monitoring station 12.

The monitoring station 10 is controlled by a microprocessor 12. The microprocessor selects the antenna beam to be used in each measurement. The received signal is processed by a radio module 13 and the processing is controlled by the processor 12. Thus, the directions and corresponding signal strengths can be recorded. The processor 12 may analyze the results by itself, collect data to its own mass memory for later processing or send them to a centralized location for analysis. The processor 12 controls the reporting of the results to a server used for calculating and presenting results and data. This can be performed by the radio module 13 wirelessly or via a fixed line connection. The centralized server can in turn process the result data and define the exact location of the interference source. This positioning procedure is explained in more detail later.

Furthermore, the monitoring station 10 comprises an integrated Global Positioning System (GPS) unit 14. The GPS unit 14 keeps track of the exact location of the monitoring station when it is moved in the network area. The location data of the monitoring station is transmitted to the centralized server together with the monitoring data.

The beam direction of the antenna is tracked by an electric compass 15. The direction is tracked as an absolute value of the current antenna beam which is used in the measurements. For the most efficient positioning of the interference source, the direction of the antenna beam must be tracked accurately. The beam direction data is sent to the centralized server for further analysis.

The monitoring station 10 is provided with a battery 16 in order to offer the power supply to the monitoring station without restricting the mobility of the monitoring station or providing battery back up in case of lost main power.

Figure 2:
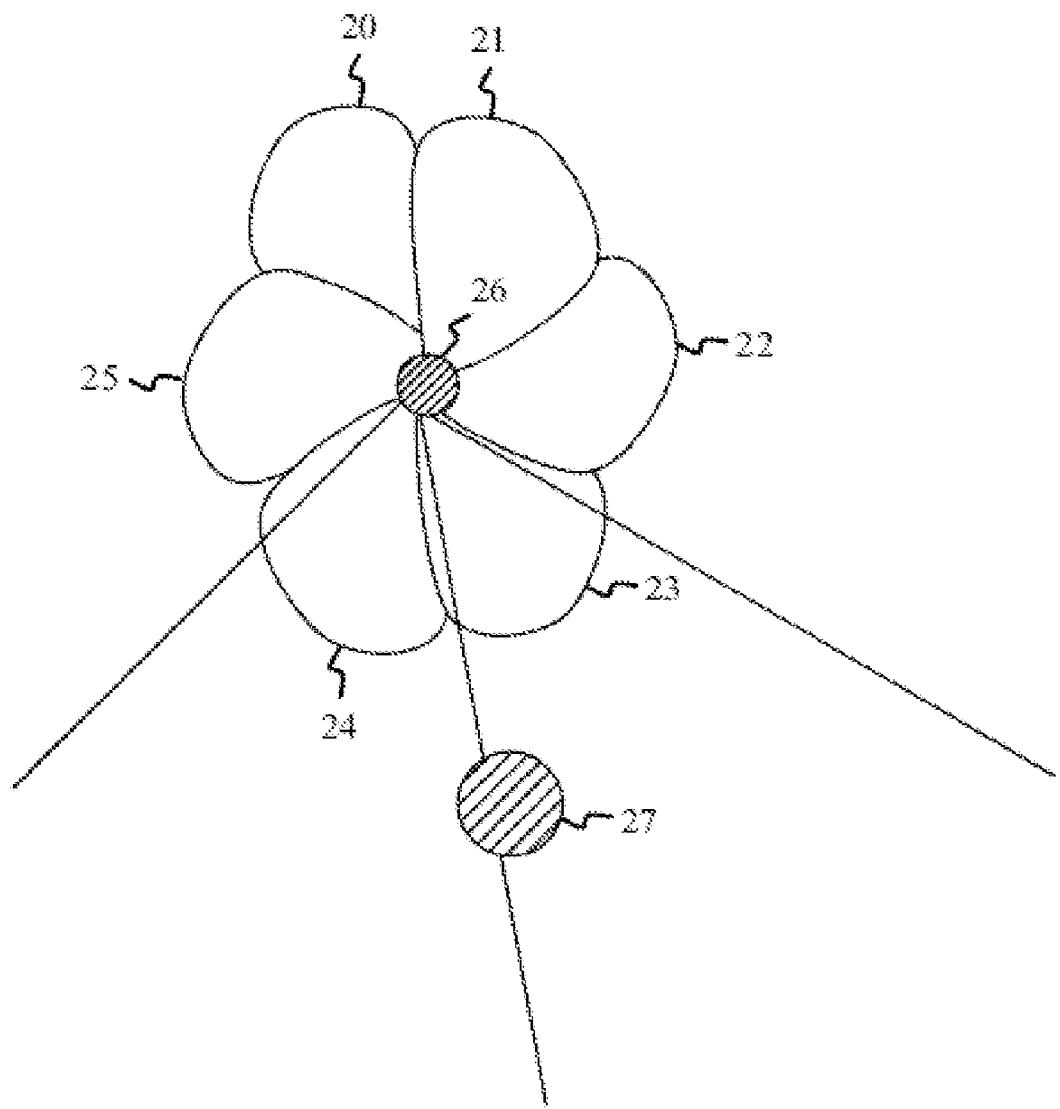
FIG. 2 illustrates an example of the positioning procedure with a monitoring station.

FIG. 2 shows one example on the positioning procedure when an interfering source 27 situates near the monitoring station 26. The monitoring station 26 includes a directional antenna which in this example is able to produce six antenna beam directions which together form an omnidirectional radiation pattern. These antenna beams are shown in the Figure as 20-25. The monitoring station can switch between beams horizontally. After the switching, the desired signal level is measured. In the configuration of FIG. 2 the antenna beam 23 is chosen. The measurement of the signal then shows that there is a transmitting device within the area of the chosen antenna beam 23. The maximum amplitude is an important parameter which can be saved to a memory. Furthermore, the whole frequency response in a broader receiver band can be detected and saved to the memory. The monitoring station then switches to another beam which is the beam 24 which is adjacent to the previously used beam. The receiver detects the signal with the similar form but with different amplitude. The peak amplitude and/or the whole frequency response can be saved to the memory as well. The monitoring station then sends the measurement data to the centralized server. If the peak amplitudes are the same, the server will define that the signal source lies right in between the two used antenna beams, thus in half way of the antenna directions of the antenna. If the two amplitudes differ in magnitude, the centralized calculation server will use the antenna beam form data together with the amplitude data. When the signal source moves towards the middle of the beam 23, the measured amplitude with the beam 24 is attenuated depending on the beam form. With such a calculation procedure, the system is able to locate the relative angle of the signal source in much more accurate manner than with a single antenna beam configuration.

Figure 3:
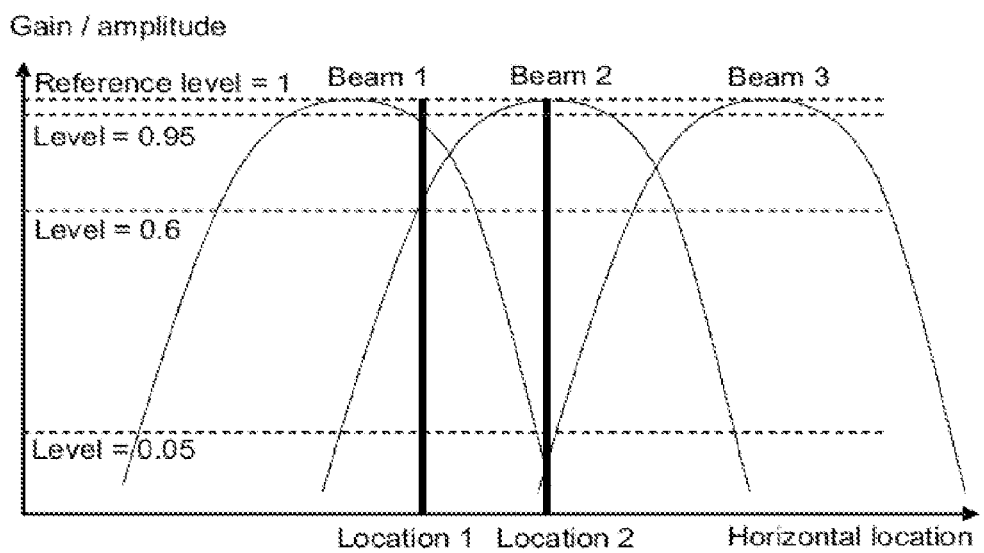
FIG. 3 illustrates an example of the positioning procedure using two antenna beam forms and received signal levels.

In FIG. 3, a more accurately described example is shown for the source positioning. Three adjacent antenna beams are shown so that the horizontal rotation angle of the antenna is presented in X-axis. The Y-axis shows the amplitude level. Two examples with different horizontal source locations are shown in FIG. 3. In the first measurement with a first location for the source, a first antenna beam gives a received signal amplitude of 0.95. The second antenna beam which lies adjacent to the first one, gives a received signal amplitude of 0.6. As the beam forms are known, the system is able to calculate the horizontal placement of the signal source very accurately from the achieved amplitude ratio.

In the second example of the FIG. 3, the signal source has repositioned itself after which the measurement is reproduced. According to the third measurement, the received signal amplitude with the first antenna beam is 0.05. After that the fourth measurement is performed with the second antenna beam and the received signal amplitude is then 1.0. Horizontal location of the source is calculated based on the relative signal level with at least two antennas with known beam form. In the latter example, the location of the source can be determined very close to the middle of the second beam. Absolute signal level values have been shown in this example as normalized values for simplicity.

Figure 4:
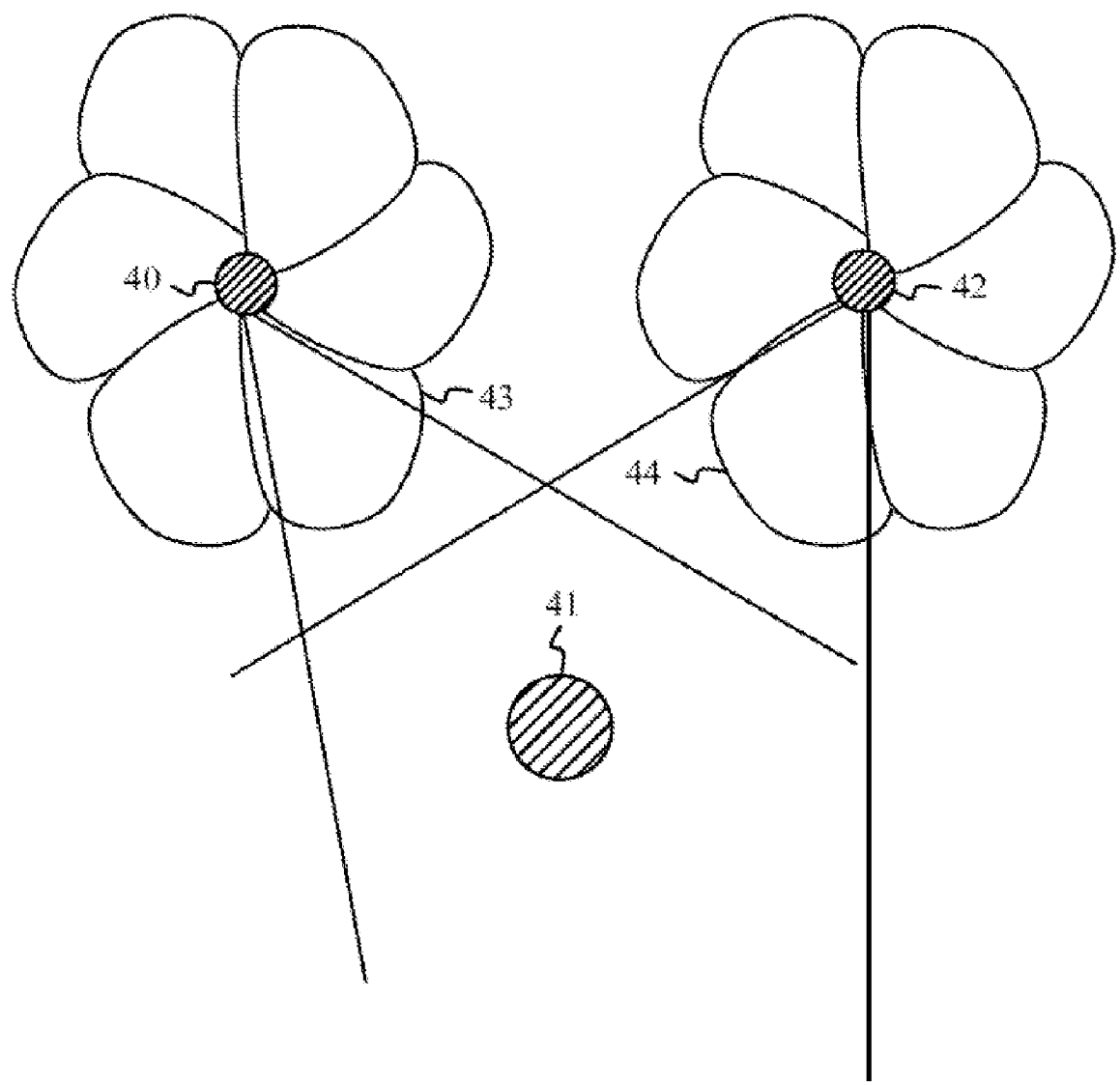
FIG. 4 illustrates an example of the positioning procedure with two monitoring stations.

Furthermore, FIG. 4 shows an example of the source positioning with two different monitoring stations. In the first position for the monitoring station 40, the antenna beam 43 is taken into use. The measurement gives a certain amplitude level in the used antenna beam direction which indicates that the interference or other kind of signal source 41 lies within the sector of the used beam 43. After that the second monitoring station 42 takes the beam 44 into use. In order to be most efficient, the direction of the beam 44 is approximately perpendicular to the direction of the beam 43 but this is not necessary for the measurement. When the amplitude level is seen higher than the average noise level, the system determines that the signal source locates also within the sector of the antenna beam 44. As a result, the centralized server receives the measurement data from the monitoring stations, and determines that the signal source lies in the intersecting area of the two sectors. Naturally, even more monitoring stations can be used for further performing a more accurate location for the signal source. Furthermore, the measurements can be performed by a single monitoring station which is a mobile unit in the area around the interesting source 41. In a further embodiment, the centralized server is able to place the located signal source into a map on a display in order to present the source location graphically to the network administrator or other user of the system. The signal source can be any kind of signal source, for example the end user, the base station or an interfering signal source.

Figure 5A:
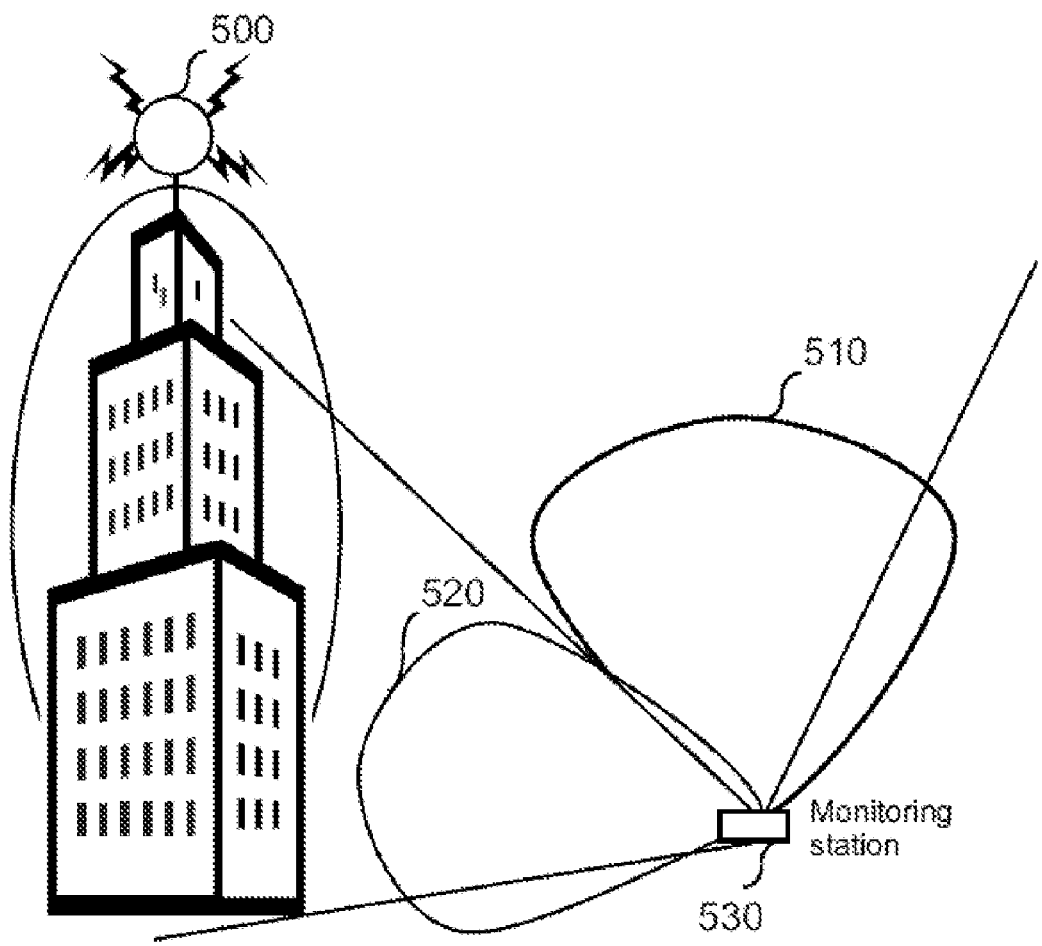
FIG. 5a illustrates a first example of the positioning procedure with several measurement locations.

In a further embodiment showing a vertical measurement for the signal source is shown in FIG. 5*a*. An interfering source 500 or other interesting signal source is situated on the top of a high building. A monitoring station 530, similar to the one shown in the previous embodiment, can have an additional antenna beam, whose direction is elevated from the horizontal plane. In FIG. 5*a* there is a vertical beam 510 and a horizontal beam 520. With such a configuration, the vertical direction of the source is trackable when combined with the measurement with at least one horizontal beam. When the vertical component of the direction and the horizontal component of the direction is combined with the distance of the source (for example, with the round trip time measurement), a good estimate for the 3-D location for the signal source is achieved. The vertical elevation can also be added to the previously described configurations of the monitoring stations. Of course, the elevation of the antenna beam can point upwards or downwards from the antenna. The invention gives possibility of placing the monitoring stations freely in the 3-D area of the network, and also the antenna beams can point to any direction.

There are also numerous other ways for calculating the location of the signal source in a more accurate manner. As briefly mentioned in the previous paragraph, a round trip measurement is useful for determining the distance between the end user and the monitoring station or between the end user and the base station. This is implemented so that the monitoring station or the base station transmits a test signal to the end user. The terminal of the end user receives the test message and immediately sends a reply message. When the reply message is received at the monitoring station or the base station, the round trip time of the signal can be easily converted into the traveled length of the signal path, which is twice the length of the desired distance between the end user and the monitoring station (or base station). If there exists a delay in transmitting the reply message, it can be taken into account in the calculation of the distance as the permissible delay values are defined by the standard. When the distance data is combined with the direction data, a relatively good estimate of the signal source location in 3D space is achieved.

Figure 5B:
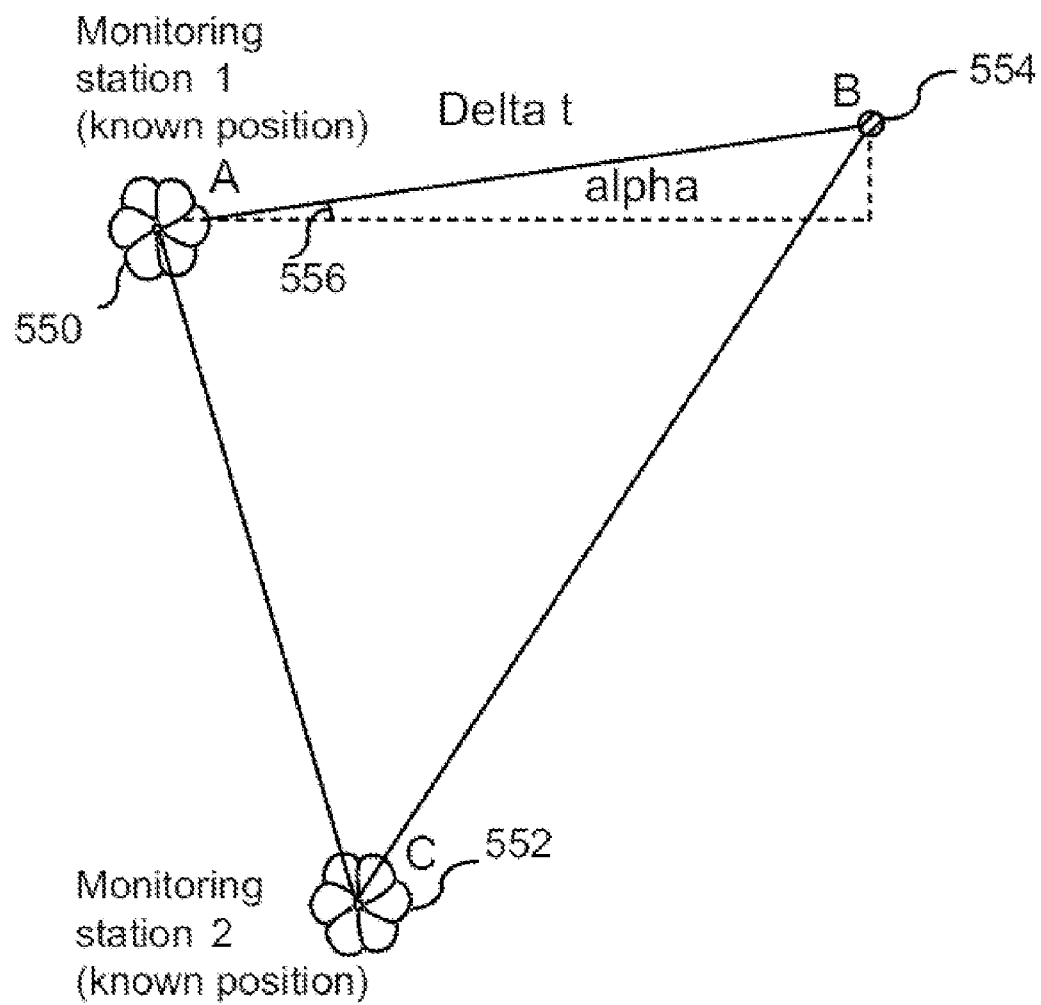
FIG. 5b illustrates a second example of the positioning procedure with several measurement locations.

Furthermore, the positioning accuracy can be enhanced by the following procedure which is illustrated in FIG. 5b as an example of the invention. In FIG. 5b there is a target 554, a first monitoring station 550 and a second monitoring station 552. The source B is the target to be located, that is, target 554. Monitoring station 1 (A) received the signal sent by source B and the angle of direction 556 (alpha) is determined from the used antenna beam or several used beams. Furthermore, the distance between monitoring station A, in other words, monitoring station 550, and source B is determined by the round trip time measurement. This procedure starts when the station A sends an acknowledgement request message at time instant $t_1$. The station B receives the acknowledgement request message at time instant $t_2$. After that the station B sends the acknowledgement (IMM_ACK) message at time instant $t_3$ which in turn is received at the station A at the time instant $t_4$. The cycle of the messages is complete when the station A sends another acknowledgement request message at time instant $t_5$. The time $t_2$-$t_3$ represents remote end delay and the time $t_4$-$t_5$ is the local end delay. These two values are known because the IEEE standard 802.11 specifies limits for them. When the local and remote end delays are removed from the cycle time, 'Δt' is achieved and the distance between A and B can be calculated based on 'Δt'. Finally, an accurate location of the source B is calculated based on the angle 'alpha' and the calculated distance.

Figure 5C:
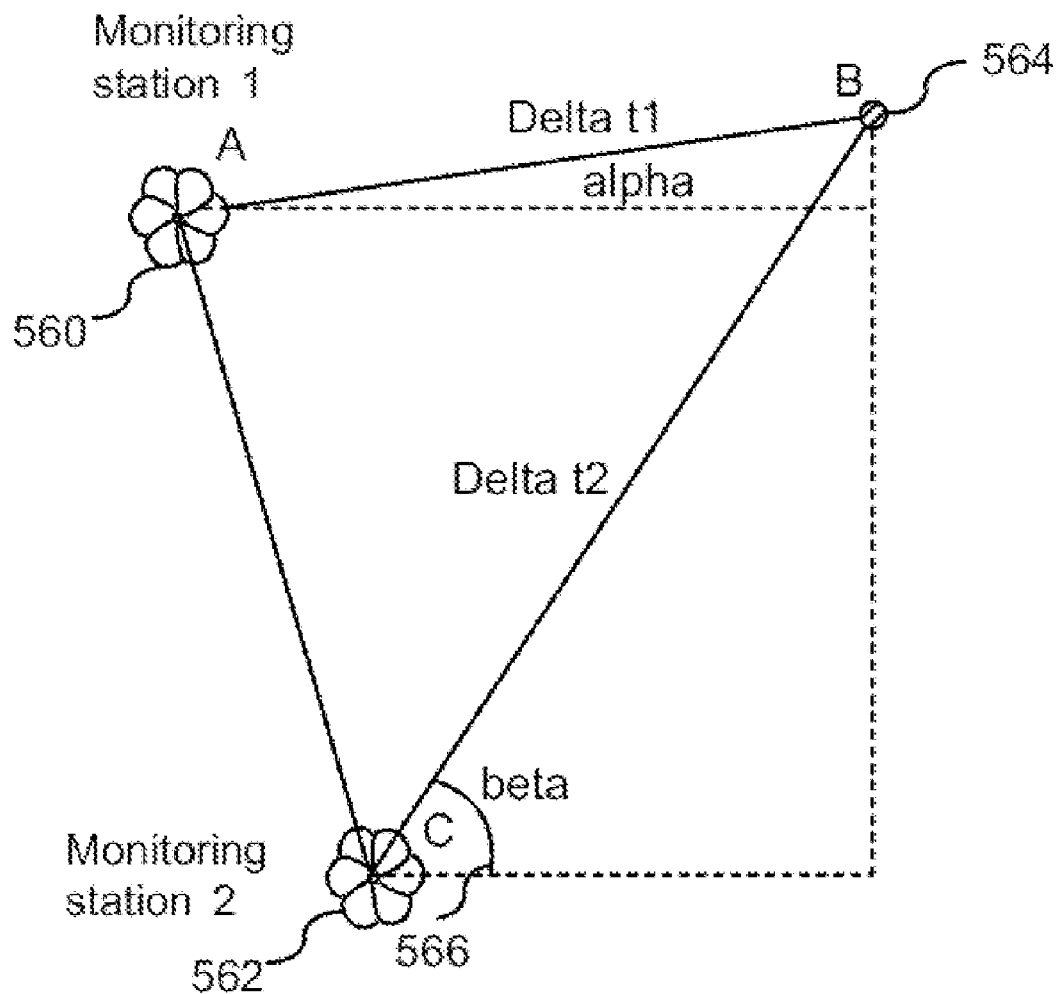
FIG. 5c illustrates a third example of the positioning procedure with several measurement locations.

Furthermore, in FIG. 5c is illustrated yet another embodiment of the positioning method. In FIG. 5c there is a first monitoring station 560 and a second monitoring station 562 and a source 564, that is, source B. The direction of the transmitted signal by B (illustrated by alpha) and the distance between monitoring station A, in other words, monitoring station 560, and source B is determined as in the example of FIG. 5b. Additionally, another monitoring station C, that is, monitoring station 562 is added to the system for enhancing the positioning accuracy even more. The second monitoring station receives the signal sent by the signal source B. Using the antennas of station C, an angle 'beta' 566 is achieved. Similarly as in the previous example, the distance between C and B is further calculated from the round trip time measurement. Because the exact locations of both monitoring stations A and C are known using e.g. the GPS positioning, the system is able to combine measurement data from both stations A and C in order to define a precise estimate on the location of B. In a further embodiment of the invention, even more monitoring stations can perform similar measurements and all the results achieved by the monitoring stations can be combined.

Furthermore, in one embodiment of the invention, known locations of the base stations can be taken into account as well. User may point and click the location of the monitoring station to a floor plan or map. When such information is combined with the measurements achieved by the monitoring station(s), the precision of the positioning is enhanced even more. Furthermore, when the system knows the base station which is serving the desired user at a given moment, the system can restrict the positioning of the user in the serving area of the base station.

In one embodiment of the invention, the centralized server transmits test signal through several base stations to the desired end user station. The test signal can be for example a "PING" command. The routing of the test signal is performed by using the MAC (Medium Access Control) or IP address of the base station. The monitoring station transmits the test results to the centralized server which can then locate the end user by using the test results. When test results are worsening, this can generally be interpreted as longer distance to the end user. This testing can be combined with the previously described measurements in order to enhance the performance of the positioning. Used coding can also be monitored by the monitoring station. When the coding is more robust i.e. less complex modulation scheme and more forward error correction, this can generally be interpreted as a longer distance.

The previous described embodiments of the invented method generally result in a ring-shaped area where the signal source must be locating. When the different methods result in several ring-shaped areas estimating the location, the cross-section of such areas gives a much more accurate estimate on the source location.

Figure 6:
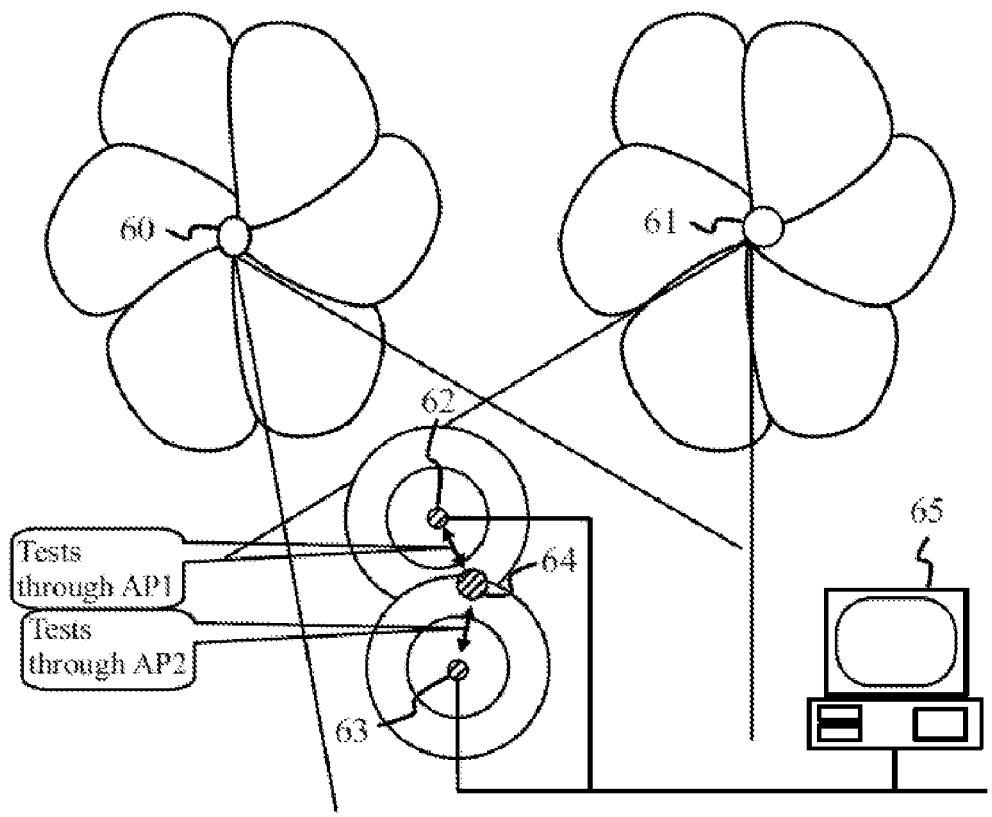
FIG. 6 illustrates an example of testing the optimality of the base station serving the user.

In an embodiment of the invention, a reference to FIG. 6 is made. In this example, a different kind of test for the base stations is performed. Namely, the system can test whether the most suitable base station is chosen for the end user. By testing different test routes, the system can determine whether the most optimal base station is chosen for the user terminal. If the test reveals the base station as suboptimal (for example, situating too far away), the monitoring station can send a reconnection request for switching off the connection to the suboptimal base station and for connecting the user to the best available base station in the network area. In FIG. 6, the end user 64 is located in the vicinity of a first base station 62 (or generally, access point AP1) and a second base station 63 (AP2). The test server 65 is connected to both base stations 62, 63 and the test server 65 transmits the test traffic as e.g. in the form of PING messages. Different size of PING messages may be used to verify characteristics of the signal route. The test server 65 receives test results from AP1 62 and AP2 63 and determines the better result. The better result can be a shorter reply time for the PING message. An optimal base station for the user terminal is thus determined. By combining two monitoring stations 60, 61 with their directional antennas, a positioning procedure according to the previous examples can be performed for determining the user location.

Figure 7:
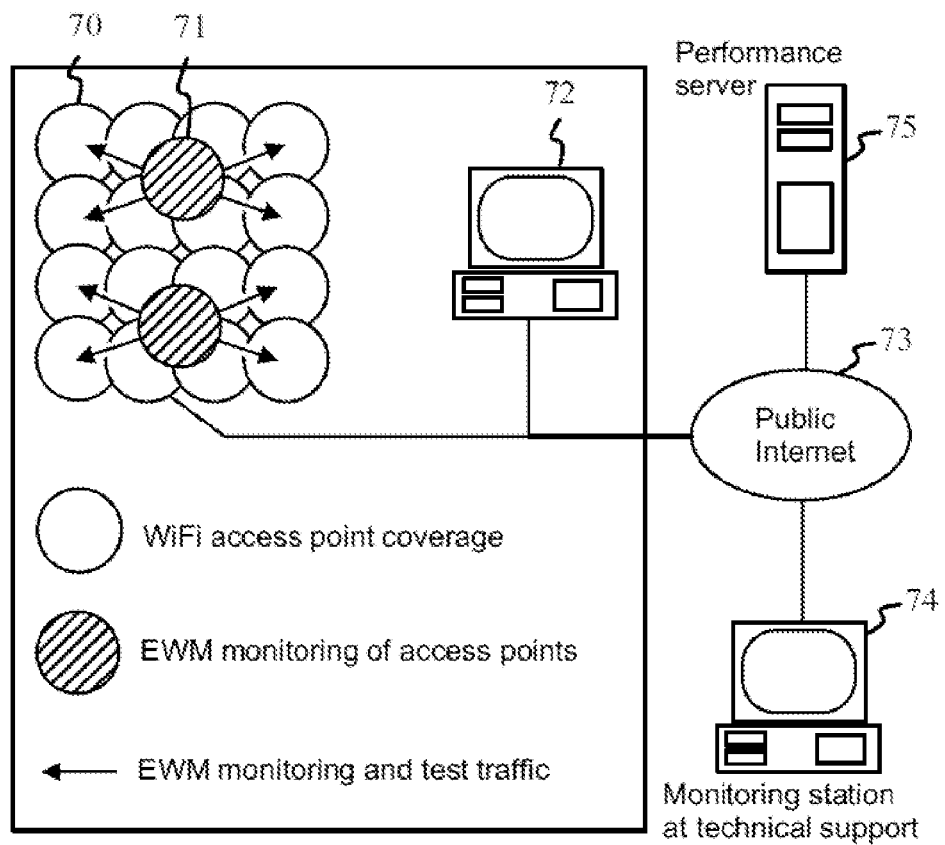
FIG. 7 illustrates an example of the equipment used in the system in one embodiment of the invention.

FIG. 7 discloses an example of the system used in the invention. The illustration shows the main components. Each sphere 70 includes a WiFi (WLAN) access point with the area covered around each of them. There are two monitoring stations 71 placed in the area. The arrows originating from the monitoring stations describe the test traffic transmitted by the monitoring stations. The reporting suite 72 collects the measurement results sent by the monitoring stations 71. The measurement results can also be sent via public internet access 73 to a performance server 75 or to another reporting suite 74. This server 74 can be located in the premises of the third party and in one example, the third party is a technical support service. The actual positioning calculation can be performed by either reporting suite 72, 74. The centralized server 75 can collect the network quality data concerning the interference sources present as a function of time. The performance server 75 or reporting suite 74 can map the interference sources to a graphic display. The user can examine the interference levels and source places at any desired time using the saved history of the measurements.

In an embodiment of the present invention, the monitoring station can be implemented in a vehicle. Such a monitoring station can be freely placed in the network area if sudden interference or other need for signal source positioning takes place in the network.

In one embodiment of the invention, the positioning procedure can be applied to the Real Time Location Systems (RTLS). RTLS uses tags which are attached to objects being located. They work like Radio Frequency Identification (RFID) tags so that there is a reader receiving the signals transmitted by the tags. The reader is therefore analogical to the monitoring station disclosed earlier. The advantage of the RTLS system is that less equipment is needed for the successful positioning of the objects or signal sources. Normally RTLS systems require three access points in the area for the successful positioning. With the system according to the present invention, only one monitoring station is needed for achieving satisfying positioning results.

Furthermore, the presented method of the invention can be applied to positioning of active RFID tags. In that case the monitoring station takes the role of the RFID reader in order to monitor the tags in the vicinity of the monitoring station. Furthermore, RFID readers might be connected via a WLAN connection to internet or other network. The wireless WLAN connection can be monitored with the monitoring station and in case of failure or other problems in the connection, alarm to the service provider can be triggered.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, G3 communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for signal source positioning in a wireless communication system, the signal source being a user terminal or a base station, comprising:

measuring received signals in at least one location with a steerable beam antenna by using at least one monitoring station, by measuring a round trip time or data transmission/acknowledgement sequence delay in the monitoring station for the signals transmitted and received by the same or by an adjacent monitoring station;

calculating the direction of the signal source using the at least one antenna beam and collecting location of the monitoring station;

calculating the distance between the signal source and the monitoring station from the round trip time or data transmission/acknowledgement sequence delay; and calculating the location of the signal source from the said direction and the said distance.

2. The method according to claim 1, the method further comprising:

steering the antenna beam horizontally, vertically or in both directions before transmission or reception of signals.

3. The method according to claim 1, the method further comprising:
measuring the direction of the antenna beam by an electrical compass.

4. The method according to claim 1, the method further comprising:
measuring the location of the monitoring station using the Global Positioning System.

5. The method according to claim 1, the method further comprising:
measuring signals in at least two different locations of the monitoring station; and
defining the location of the signal source in the intersecting volume of the at least two used antenna beams.

6. The method according to claim 1, the method further comprising:
measuring signal levels with at least two antenna beams of the monitoring station; and if the signal source is detected with both antenna beams,
calculating the location of the signal source using the beam amplification forms of the antenna and the measured signal levels.

7. The method according to claim 1, the method further comprising:
transmitting the measurement results to a server; and
calculating the location of the signal source in the server.

8. The method according to claim 1, the method further comprising:
determining the signal propagation time for the received signal in the monitoring station; and
calculating the distance of the signal source from the said propagation time.

9. The method according to claim 1, the method further comprising:
detecting the interfering signal source by comparing the received signal level to the noise level, with respect to the received traffic in the network.

10. The method according to claim 1, the method further implemented in a WLAN or in a WiMAX network, or as part of the Real Time Location System or the Radio Frequency Identification system.

11. A system for signal source positioning in a wireless communication system, the signal source being a user terminal or a base station, comprising:
at least one monitoring station comprising measuring means which are configured to measure received signals in at least one location with a steerable beam antenna, by measuring a round trip time or data transmission/acknowledgement sequence delay in the monitoring station for the signals transmitted and received by the same or by an adjacent monitoring station;
a microprocessor configured to calculate the direction of the signal source using the at least one antenna beam and to collect location of the monitoring station in a memory; and
said microprocessor controlling calculating means which are configured to calculate the distance between the signal source and the monitoring station from the round trip time or data transmission/acknowledgement sequence delay, and to calculate the location of the signal source from the said direction and the said distance.

12. The system according to claim 11, the system further comprising:
antenna steering means configured to steer the antenna beam horizontally, vertically or in both directions before transmission or reception of signals.

13. The system according to claim 11, the system further comprising:
an electrical compass configured to measure the direction of the antenna beam.

14. The system according to claim 11, the system further comprising:
connectivity means to the Global Positioning System for measuring the location of the monitoring station.

15. The system according to claim 11, the system further comprising:
said measuring means configured to measure signals in at least two different locations of the monitoring station; and
said calculating means configured to define the location of the signal source in the intersecting volume of the at least two used antenna beams.

16. The system according to claim 11, the system further comprising:
said measuring means configured to measure signal levels with at least two antenna beams of the monitoring station; and if the signal source is detected with both antenna beams,
said calculating means are configured to calculate the location of the signal source using the beam amplification forms of the antenna and the measured signal levels.

17. The system according to claim 11, the system further comprising:
a transmitter in a monitoring station configured to transmit the measurement results to a server; and
second calculating means configured to calculate the location of the signal source in the server.

18. The system according to claim 11, the system further comprising:
said calculating means configured to determine the signal propagation time for the received signal in the monitoring station; and
said calculating means configured to calculate the distance of the signal source from the said propagation time.

19. The system according to claim 11, the system further comprising:
said calculating means configured to detect the interfering signal source by comparing the received signal level to the noise level, with respect to the received traffic in the network.

20. The system according to claim 11, the system further implemented in a WLAN or in a WiMAX network, or as part of the Real Time Location System or the Radio Frequency Identification system.

21. A computer program for signal source positioning in a wireless communication system, the signal source being a user terminal or a base station, the computer program embodied on a computer readable medium, the computer program controlling a data-processing device to perform:
measuring received signals in at least one location with a steerable beam antenna by using at least one monitoring station, by measuring a round trip time or data transmission/acknowledgement sequence delay in the monitoring station for the signals transmitted and received by the same or by an adjacent monitoring station;
calculating the direction of the signal source using the at least one antenna beam and collecting location of the monitoring station;

calculating the distance between the signal source and the monitoring station from the round trip time or data transmission/acknowledgement sequence delay; and calculating the location of the signal source from the said direction and the said distance.

22. The computer program according to claim 21, the computer program further controlling a data-processing device to perform:

steering the antenna beam horizontally, vertically or in both directions before transmission or reception of signals.

23. The computer program according to claim 21, the computer program further controlling a data-processing device to perform:

measuring the direction of the antenna beam by an electrical compass.

24. The computer program according to claim 21, the computer program further controlling a data-processing device to perform:

measuring the location of the monitoring station using the Global Positioning System.

25. The computer program according to claim 21, the computer program further controlling a data-processing device to perform:

measuring signals in at least two different locations of the monitoring station; and defining the location of the signal source in the intersecting volume of the at least two used antenna beams.

26. The computer program according to claim 21, the computer program further controlling a data-processing device to perform:

measuring signal levels with at least two antenna beams of the monitoring station; and if the signal source is detected with both antenna beams, calculating the location of the signal source using the beam amplification forms of the antenna and the measured signal levels.

27. The computer program according to claim 21, the computer program further controlling a data-processing device to perform:

transmitting the measurement results to a server; and calculating the location of the signal source in the server.

28. The computer program according to claim 21, the computer program further controlling a data-processing device to perform:

determining the signal propagation time for the received signal in the monitoring station; and calculating the distance of the signal source from the said propagation time.

29. The computer program according to claim 21, the computer program further controlling a data-processing device to perform:

detecting the interfering signal source by comparing the received signal level to the noise level, with respect to the received traffic in the network.

30. The computer program according to claim 21, the computer program further implemented in a WLAN or in a WiMAX network, or as part of the Real Time Location System or the Radio Frequency Identification system.

\* \* \* \* \*

UNITED STATES PATENT AND TRADEMARK OFFICE
CERTIFICATE OF CORRECTION

PATENT NO. : 8,390,515 B2  Page 1 of 1
APPLICATION NO. : 12/668144
DATED : March 5, 2013
INVENTOR(S) : Veli-Pekka Ketonen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this

First Day of September, 2015

Michelle K. Lee
*Director of the United States Patent and Trademark Office*